Dec. 4, 1934.   F. W. DEARBORN   1,982,643
TRAIN PIPE COUPLER
Filed Oct. 12, 1933
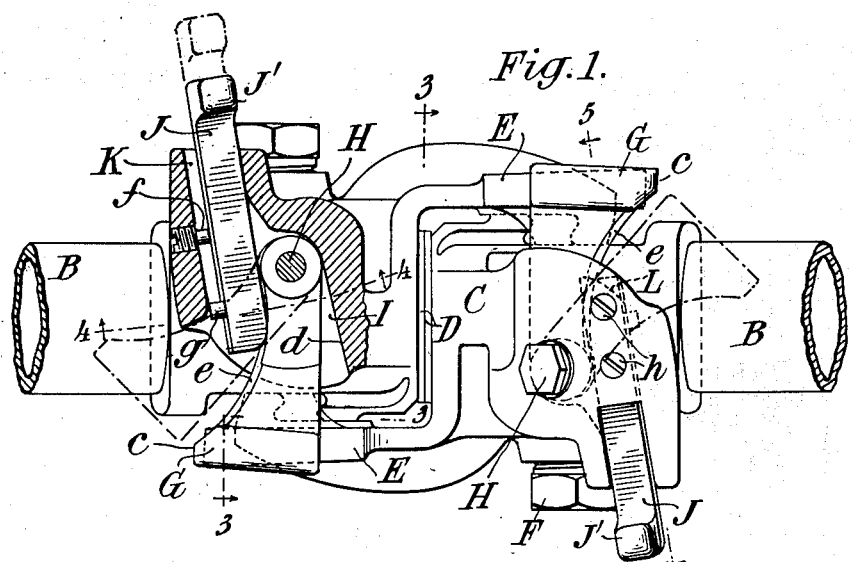
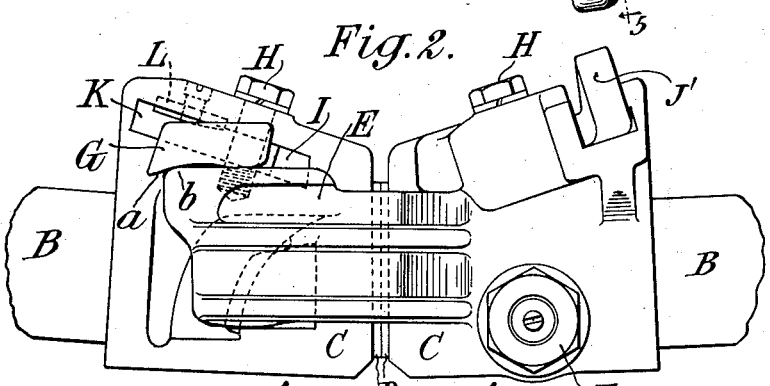
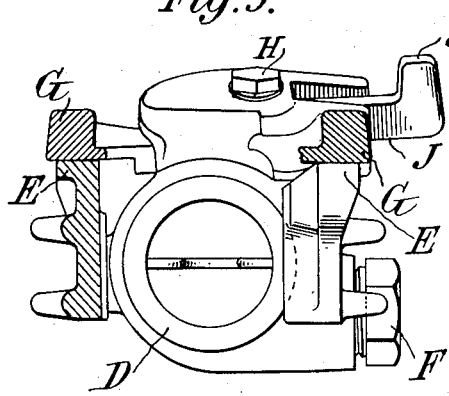
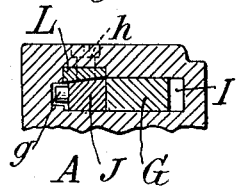
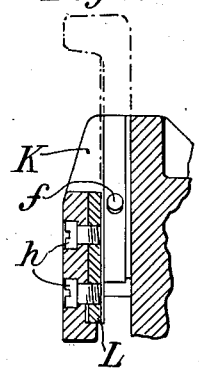
INVENTOR
Frank. W. Dearborn
BY
Fraser, Myers + Manley
ATTORNEYS.

Patented Dec. 4, 1934

1,982,643

UNITED STATES PATENT OFFICE 1,982,643

TRAIN PIPE COUPLER

Frank W. Dearborn, Brooklyn, N. Y., assignor to Gold Car Heating & Lighting Company, Brooklyn, N. Y., a corporation of New York Application October 12, 1933, Serial No. 693,235

8 Claims. (Cl. 285—68)

This invention relates to train pipe or hose couplers such as are commonly used for coupling the steam-heating pipes of railway cars. It relates to the standard type of such couplers which comprises two abutting heads, each having on one side a locking arm which projects toward and overlaps the other head, and this arm and the adjacent side or cheek of the other head having engaging lugs which wedge together as the heads are rocked downward into locking engagement, the abutting ends of the two heads having gaskets for making a steamtight joint.

Various devices have been employed for locking together such couplers in order to prevent their accidental disengagement. Such locking means have consisted of some provision on one head for engaging some part of the other head to obstruct and prevent their unlocking movement, which is performed by swinging up the couplers. One form of such lock has comprised a sliding key or wedge housed in the top of one head and when protruded by being driven forward, overlying the locking arm of the other head whereby to prevent the upward or unlocking movement of that arm; both heads may have such locking key or it is sufficient if only one head is so provided. One difficulty with all such locking devices is that the couplers vary considerably in their contour or dimensions, so that when fully locked the position of the locking arm with respect to the head which it engages has a considerable range of variability in height. A moderate range of such variability is cared for by the wedging face of such a key; but it frequently happens when couplers of different make are intercoupled that the key when driven forward does not contact with the locking arm and consequently is not wedged fast so as to reliably retain its locking position; and it may even happen that the clearance or lost motion is sufficient to enable the couplers to become partially uncoupled so that their gaskets are no longer held together in leaktight manner.

The present invention aims to overcome these disadvantages and provide a coupler lock with such a range of adjustability as to compensate for all expected variations when dissimilar couplers are intercoupled. To this end it comprises a wedging dog, which is preferably pivoted to one of the heads and moves laterally into engagement with the arm of the complemental coupler, and a separate key mounted on the same head and movable into wedging engagement with said dog to hold the latter in locked position. The dog has an inclined or curved wedging face and the key engages this face and as it is driven forward wedges the dog into closer engagement with the locking arm of the mating coupler. The locking keys are usually driven forward with a hammer blow and this insures a tight wedging engagement of the key and dog; but to afford further assurance that the key shall be firmly seated in its housing so that it can not work loose, I provide the key and housing with wedging surfaces such that as the key is tightened against the dog its wedging surfaces are forced into tight engagement.

The preferred construction of the device will be more fully described with reference to the accompanying drawing, wherein—

Figure 1 is a plan of a pair of couplers provided with my invention, one of the heads being partly in section to more clearly show the locking parts;

Fig. 2 is a side elevation of the coupled heads;

Fig. 3 is a transverse section on the line 3—3 in Fig. 1;

Fig. 4 is a fragmentary section on the line 4—4 in Fig. 1;

Fig. 5 is a fragmentary section partly on the line 5—5 in Fig. 1.

In the drawing, A, A are the couplers as a whole, and B, B are the usual shanks or nipples for engagement with the hose or pipe to be coupled. Each coupler comprises a head C provided with a gasket D, the heads meeting endwise, with the gaskets forced together. Each head also has a projecting arm E on which and on the adjacent face of the opposite head are the usual wedging locking projections which engage in an eccentric manner as the upper heads are rocked downward together in the coupling movement. The couplers usually are provided with a drainage valve F. As thus far described, the construction is the normal, standard type of gravity coupler for car heating hose or the like.

According to my invention each coupler head A is provided on its top with a laterally movable dog G, preferably pivoted on a pivot pin H, which is shown as a tap screw fastened to the top of the head. The dog G, as shown in Fig. 2, has a lower wedging face $a$ which, as it is swung from the position in dotted lines in Fig. 1 to the position in full lines, overlies and wedges downwardly upon the top surface $b$ of the locking arm E of the mating coupler. The wedging action is due in part to the axis of the pivot pin H being inclined as shown in Fig. 2, with a corresponding inclination of the cavity or housing I in which the dog moves; so that the dog, when forced into locking position, moves downward obliquely and has at its locking end a wedging action between the surfaces $a$ and $b$. Its outer end is prolonged at $c$ sufficiently so that it may be easily struck with a hammer or such tool for driving it tightly home. The dog is capable of a considerable range of movement after it is swung into the locking position, so that if upon its first engagement with the locking arm it does not bear down forcibly enough, it may be driven as far over that arm as is necessary to complete the wedging and locking action. Thus as an extreme it may in the construction shown be swung over until its straight face abuts against the side wall *d* (Fig. 1) of the housing.

This wedging dog alone makes a very firm locking engagement with the mating coupler, and would of itself constitute an effective lock in most instances and one which is superior to the coupler locks heretofore in use. However, it is desirable, for further security, to lock the dog itself by another locking member, for which purpose the coupler is provided with a sliding wedging key J which moves endwise through a housing K formed in the coupler head and which communicates with the housing I for the dog. Thus the key and the dog within the housing are in the same plane, the arrangement being such that as the key is driven forward from its position shown in dotted lines in Fig. 1 to its position shown in full lines, its rounded locking end bears against the dog with a wedging action which backs up the dog and prevents it working loose by backing off from its wedging lock with the mating coupler arm. In order to give the dog a considerable lateral movement and enable the key to lock it in any one of its locking positions with equal wedging effect, the dog is formed with a curved wedging face *e*, against which the rounded wedging end of the key engages. Thus, if to make a tight locking engagement, the dog were to be swung further to the right than shown in the sectional portion of Fig. 1, the key J, on being driven home, would engage a more advanced portion of its curved face *e*; the curvature of this face being such that in any interlocking position of these parts there is a similarly effective wedging engagement.

The key J has its outer end upturned at J' in order that in unlocking the coupler preparatory to uncoupling, the trainman may be able to drive the key back by striking this upturned end J' with a hammer or other tool. To hold the key in place and prevent it working out when retracted, the head is provided with a stop *f*, which is conveniently made as a screw pin, as shown in Fig. 1; and the key is formed with a reciprocal pin or projection *g* which when it is fully retracted encounters the stop *f*.

The key J and its housing K are formed with inclined wedging faces, as shown in the cross section in Fig. 4, so that when the key is driven into locking engagement with the dog G, it is thereby forced back in its housing so as to bring these inclined faces into tight wedging engagement and thereby securely wedge fast the key. This in itself is an old feature, being shown in the patent of Edward E. Gold, No. 1,792,490, dated February 17, 1931; but it is now for the first time employed with a key which is in itself not a locking element but which locks fast the locking element or dog G. Thus my invention combines three wedging functions, namely, that at the engagement of the dog G with the mating arm, that at the engagement of the key with the wedging face of the dog, and that at the seating of the dog between the wedging walls of its cavity. The result is a thoroughly reliable coupler lock which when locked can never become unlocked.

To take up wear between the wedging faces of the key and its socket or housing, it is preferable to provide a wear plate L, as best shown in Figs. 4 and 5, which is a plate of hard wearing material, held in place by screws *h* passing through the top part of the housing.

While the drawing shows the preferred embodiment of the invention, it will be understood that it is susceptible of a certain degree of modification, its essential features being set forth in the following claims.

I claim as my invention:

1. A hose coupler comprising a head and coupling means, provided with a lock comprising a laterally movable dog housed in the head and moving into wedging engagement with a mating coupler to hold the respective heads coupled, the head having a housing with its top overlying the dog inclined in a plane oblique to the longitudinal axis of the coupler and sloping downward toward the meeting faces thereof, and the dog movable in a direction generally longitudinally of the coupler, so that its portion overlying the mating coupler is wedged downwardly thereon during forward movement by the inclined top of the housing.

2. A hose coupler comprising a head and coupling means, provided with a lock comprising a laterally movable dog pivoted thereto and swinging within an oblique housing in the head, the dog having a projecting portion overlying and movable into wedging engagement with a part of a mating coupler, such housing being in an inclined plane approaching the longitudinal axis of the coupler toward the meeting face thereof.

3. A hose coupler comprising a head and coupling means, provided with a lock comprising a laterally movable dog pivoted thereto upon an axis oblique to the longitudinal axis of the coupler and swinging within a housing in the head in a plane normal to said axis and inclined relatively to said longitudinal axis with its lower side toward the meeting face of the coupler, the dog having a projecting end overlying the locking arm of the mating coupler, the obliquity relative thereto affording a wedging action as the dog is driven into locking engagement with such arm.

4. A hose coupler comprising a head and coupling means, having a wedging dog movable laterally into engagement with a mating coupler, to hold the respective heads coupled, and a key arranged laterally of the dog and movable into wedging engagement with the side of said dog to urge the latter in the direction of locking engagement with the mating coupler, 5. A hose coupler comprising a head and coupling means, having a wedging dog movable laterally into engagement with a mating coupler, its locking movement being longitudinally of the coupler to hold the respective heads coupled, and capable of varying extent of such longitudinal movement to adapt it to variations in couplers, and a key movable laterally of the coupler into wedging engagement with the side of said dog in any operative positions of the latter to press the dog into wedging engagement and hold it in place.

6. A coupler according to claim 4, with the key and its housing having relatively inclined surfaces adapted to be wedged together as the key is driven into wedging engagement with the dog.

7. A hose coupler comprising a head and coupling means, having a wedging dog movable laterally into engagement with a mating coupler, to hold the respective heads coupled, said dog having a curved rear side, and a key movable into wedging engagement with said dog to hold the latter in place located on the rear side of the dog and movable into wedging contact with said curved side.

8. A coupler according to claim 4, the key movable in direction nearly parallel with the dog in its locked position, and exerting its wedging pressure against the rear side of the dog.

FRANK W. DEARBORN.